Patented June 29, 1954

2,682,525

UNITED STATES PATENT OFFICE 2,682,525

CROSS-LINKING POLYMERIC POLYPRIMARY AMINES WITH DIARYL CARBONATES

Harold L. Jackson, Wilmington, Del., assignor to E. I. du Pont de Nemours and Company, Wilmington, Del., a corporation of Delaware No Drawing. Application April 8, 1952, Serial No. 281,225

16 Claims. (Cl. 260—63)

This invention relates to new compositions of matter and to methods for their preparation. More particularly this invention relates to new cross-linked polymers and methods for preparing them.

Polymeric polyprimary amines which are obtained either by the reductive amination of polymers containing oxo groups, by the reduction of nitrogen-containing polymers, or by amination of polymers containing epoxy groups, are a relatively new class of chemical intermediates. Films prepared from these polymeric polyprimary amines are deficient in hardness, toughness, and resistance to water, aqueous acid solutions, and organic solvents.

It is an object of this invention to provide new cross-linked polymers and methods for preparing them. A further object is to provide a simple direct method for converting polymeric polyprimary amines to cross-linked, highly insoluble, tough products. A still further object is to provide new cross-linked polymeric polyprimary amines and film-forming compositions containing them. An additional object is to provide highly insoluble, tough films from new cross-linked polymers. Other objects will appear hereinafter.

The objects of this invention are accomplished by providing new cross-linked polymers which are the product obtained by reacting a polymeric polyprimary amine of the kind described hereinafter with at least 0.5 mole of a diaryl carbonate or a diaryl thiocarbonate per primary amino group in the polymeric polyprimary amine at a temperature of from 25° to 200° C. The polymeric polyprimary amines used in the preparation of the cross-linked polymers of this invention are those which have a main carbon chain with at least three extra-catenic primary amino groups thereon, and which have a molecular weight of at least 1000.

The examples which follow are submitted to illustrate and not to limit this invention.

Example I

To 7.8 g. of a 50% toluene solution of a polymeric polyamine having a neutral equivalent of 269, a molecular weight of 1800, and a primary amino nitrogen content of 3.43%, obtained by the reductive amination of an ethylene/carbon monoxide copolymer as described in U. S. Patent 2,495,255, there was added 1.8 g. of diphenyl carbonate dissolved in 4 ml. of toluene. A film of the resulting blend was cast on bonderized steel, the solvent allowed to evaporate at ambient temperature, and the resulting coated panel then baked for 30 minutes at 150° C. The baked film had excellent gloss, was clear, showed good mar and print resistance, and was not affected by ordinary organic solvents. At 1 mil it exhibited a pencil hardness of HB. When allowed to stand in contact with either 2% aqueous sodium hydroxide, 2% aqueous sulfuric acid, or 2% aqueous acetic acid for 20 hours, the coating was unchanged. The coating was also unchanged after being boiled in water for 24 hours. Excellent outdoor durability and resistance to hot soap solution was also characteristic of this composition.

Example II

To 4.88 g. of a 25% toluene solution of an ethylene/carbon monoxide polyamine (N. E. 244) having a molecular weight of 1550, and a primary amino nitrogen content of 3.63%, there was added 0.8 g. of di(2-chlorophenyl) carbonate. The clear solution which resulted was flowed onto a bonderized steel panel and air-dried for two hours. This coating exhibited definite cure after being air-dried and had a pencil hardness of HB. The panel was then baked at 150° C. for 30 minutes. This coating exhibited excellent gloss and flexibility and showed fair adhesion. It had a pencil hardness of HB at one mil and excellent resistance to impact and did not mar when scratched with the fingernail. Treatment for 48 hours with 2% sulfuric acid, 2% acetic acid, or 2% sodium hydroxide did not affect the coating.

A control panel prepared in the same manner, as above, except that no di(2-chlorophenyl)-carbonate was added was very tacky after being air-dried for 16 hours and still showed considerable tack after being baked at 150° C. for 30 minutes.

Example III

To 4.88 g. of a 25% toluene solution of the ethylene/carbon monoxide polyamine of Example II there was added 0.67 g. of di(4-methylphenyl)-carbonate. In order to obtain complete solution, it was necessary to warm this mixture. While still hot, the solution was flowed onto a bonderized steel panel and allowed to air dry. Although crystals of the carbonate separated when the panel was air-dried, baking at 150° C. for 30 minutes gave a smooth, cured coating which exhibited excellent gloss and mar resistance. This coating had a pencil hardness of HB at one mil and excellent resistance to impact. Two per cent aqueous solutions of sulfuric acid, sodium hydroxide, and acetic acid did not attack this composition over a period of 48 hours.

Example IV

To 4.88 g. of a 25% toluene solution of the ethylene/carbon monoxide polyamine of Example II there was added 0.65 g. of diphenyl thiocarbonate. The clear solution which formed was applied to a bonderized steel panel. After air-drying 3 hours at room temperature, a cured, hard film had formed. This is in sharp contrast to a control containing no diphenyl thiocarbonate, since the control panel was very tacky after the same treatment. After baking for 30 minutes at 150° C., the coating prepared from the polyamine and the thiocarbonate exhibited good gloss, a pencil hardness of HB at one mil, excellent resistance to impact, and good mar resistance. Treatment with 2% sulfuric acid for six hours caused the coating to blister and flush slightly. The coating exhibited good resistance to hot soap solution.

Example V

A solution of 1.69 g. of diphenyl carbonate in 5.9 g. of xylene was added to a solution of 5.25 g. of the polymeric polyamine of Example I in 5.25 g. of xylene. Films of the resulting blend cast on steel panels and baked for 30 minutes at 150° C., after air-drying, were clear and had properties similar to those of the product of Example I.

Example VI

To 11.5 g. of the polymeric amine solution, obtained as described subsequently, there was added 1.2 g. of diphenyl carbonate. The clear solution which formed was applied to bonderized steel and the coacting air-dried for 4 hours. The coated panel was then baked at 150° C. for 30 minutes. The baked coating was clear and colorless, had a pencil hardness corresponding to F, and exhibited excellent gloss and mar resistance, and was unattacked by 2% aqueous sulfuric or acetic acid, or by 2% aqueous sodium hydroxide even after 12 hours' contact. The coating was also resistant to hot soap solutions.

In contrast to the above a coating of the polyamine alone, similarly applied to bonderized steel and baked, was rapidly attacked by 2% aqueous acetic or sulfuric acids.

The polymeric amine was prepared by the catalytic reductive amination of a butadiene/methacrylonitrile copolymer having a mole ratio of butadiene/methacrylonitrile of about 4:1, as described below.

A solution of 950 g. of the 4:1 butadiene/methacrylonitrile copolymer in 1890 g. of decahydronaphthalene was placed in a pressure reactor. To this solution there was then added 850 g. of decahydronaphthalene, 110 g. of ethylene glycol, 225 g. of nickel-on-carbon, 25 g. of palladium-on-carbon, and 95 g. of liquid ammonia. The charge was hydrogenated at 1625 to 1950 lbs./in.$^2$ pressure and 250° C. for 14 hours. The hydrogen uptake during this reaction period was 3600 lbs. The product was discharged, and filtered to remove the catalyst. Analysis showed the solution to contain 28% solids. The neutral equivalent of the polyamine was 322, its molecular weight was in the range of 1500 to 2000, its total nitrogen content 5.45% and its primary amino nitrogen content 2.78%.

Example VII

To a solution of 2.6 g. of the polymeric amine, prepared as described hereinafter, in 25 ml. of ethoxyethanol there was added 1.5 g. of di(2-chlorophenyl) carbonate. The resulting clear solution was immediately applied to bonderized steel and the coating allowed to air-dry. The air-dried coating was tack-free. After baking for 30 minutes at 150° C. the coating showed excellent mar-resistance, had a pencil hardness corresponding to 8H, and was unaffected by contact with 2% aqueous solutions of sulfuric or acetic acids, or 2% aqueous sodium hydroxide.

In contrast, a coating of the polymeric amine alone, similarly applied and baked, was readily attacked by 2% aqueous solutions of acetic and sulfuric acids.

The polymeric amine used in the above example was prepared as follows:

A reactor fitted with a reflux condenser was charged with 250 g. of allyl glycidyl ether and the charge heated to reflux. To the refluxing allyl glycidyl ether there was added a mixture of 125 g. of allyl glycidyl ether, 125 g. of methyl methacrylate, and 25 g. of di-t-butyl peroxide and refluxing was continued for 1 hour after completion of the addition. During this time the temperature of the bath was 143 to 149° C. Thereafter, volatiles were removed at steam bath temperature and reduced pressure. The residue amounted to 242 g. of a colorless polymer having a molecular weight of 1380 and analyzing 6.5% oxirane oxygen, which corresponds to 46.6% allyl glycidyl ether.

Seventy-two grams of the above polymer, dissolved in sufficient methyl isopropyl ketone to yield a 70% solid solution, was diluted with 500 ml. of isopropyl alcohol. To this solution there was added 400 ml. of 28% aqueous ammonia, and the mixture divided between three closed containers, which were then placed in a rocker bath at 65° C. and shaken for 3 hours. The resulting solutions were then poured into 2 liters of ice water and the polymer, which separated, washed three times with ice water. The washed polymer was dissolved in dilute acetic acid and stored as the acetate salt. The free amine was liberated by adding ammonia to the acetate salt solution. It has a molecular weight of about 1480 and about 5.6 primary amino groups per molecule.

The polymeric polyprimary amines used in the preparation of the cross-linked polymers of this invention are those which contain at least three primary amino nitrogens and which have molecular weights of at least 1000.

One type of polymeric polyprimary amine is the product obtained by the reductive amination of ethylene/carbon monoxide copolymers, as described in U. S. Patent 2,495,255. These polymeric polyprimary amines are characterized by having a main carbon chain with amino nitrogens attached directly thereto by a single bond, the remaining valence of the amino nitrogen being satisfied by hydrogen atoms. These polymeric polyprimary amines may contain carbonyl carbon as well as other functional groups such as hydroxyl as lateral substituents on the main polymer chain. A typical polymeric polyprimary amine of this type is the following:

A stainless steel-lined reactor is charged with 40 g. of an ethylene/carbon monoxide copolymer having a molecular weight of 1480 and an ethylene/carbon monoxide mole ratio of 10.4:1, 400 g. of benzene, and 40 g. of a nickel-on-kieselguhr catalyst. The vessel is closed, evacuated, and charged with 100 g. of anhydrous ammonia. The reactor is placed on a shaker machine and connected to a source of high pressure hydrogen. Hydrogen under pressure is charged into the reactor and heating and agitation are started. The temperature is raised to 200° C. and the pressure is adjusted to 200 atmospheres. These conditions are maintained for 15 hours. The reactor is allowed to cool, excess hydrogen and ammonia are bled off, and the mixture of solvent, polymeric polyprimary amine and catalyst discharged from the reactor. The reaction mixture is diluted with benzene and filtered to remove the catalyst. Analysis of the solution shows it to contain 25% solids by weight. The product has a neutral equivalent of 525 and contains 82.15% carbon, 12.92% hydrogen, 3.12% nitrogen (Dumas method) and 2.61% primary amino nitrogen (Van Slyke method).

Another type of polymeric polyprimary amine is that which has a main carbon chain and primary amino groups attached thereto through a hydrocarbon radical of from 1 to 50 carbon atoms and preferably a hydrocarbon radical of 1 to 7 carbon atoms, such as alkylene, e. g., methylene, etc. Examples of such polymeric polyprimary amines are the products obtained by reducing poly(3-pentenenitrile), the reduction product of poly(nitrostyrene), the reduction product of nitrated butadiene/styrene copolymers, the reductive amination products from vinyl ketone polymers and copolymers with vinylidene compounds, the reduction products of polymers and copolymers of nitriles of the general formula,

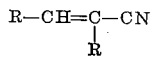

in which R is a member of the class consisting of hydrogen, alkyl, or aryl with at least one other polymerizable compound containing a $H_2C=C<$ group. Examples of such compounds are styrene, ethyl styrene, 1,3-butadiene, isoprene, vinyl naphthalene vinyl acetate, etc., as disclosed in U. S. Patent 2,456,428.

In the case of the acrylo- and alkacrylonitrile copolymers, it is generally desirable that the products hydrogenated contain at least one nitrile group for each 50 carbon atoms in the polymer chain. Because hydrogenation of the nitrile groups to amino methyl groups is usually incomplete, it is preferred that the starting polymers contain at least one nitrile group for each 25 carbon atoms in the polymer chain and that the hydrogenation be continued until the resulting polymeric amine contains at least one amino group for each 50 carbon atoms in the polymer.

Still another type of polymeric polyprimary amine is the product disclosed and claimed in the copending application of M. E. Cupery, U. S. Serial No. 176,918, filed July 31, 1950, now abandoned, of which patent application Serial No. 295,127, filed June 23, 1952, is a continuation-in-part. In these products the amino nitrogen atoms are part of an extralinear chain which contains one oxygen atom per 3 to 4 carbon atoms. Examples of such products are the reaction products of ammonia with polymeric epoxides, such as copolymers of vinyl acetate with allyl glycidyl ether, of vinyl acetate with glycidyl methacrylate, of vinyl chloride with allyl glycidyl ether, etc.

In the cross-linked products of this invention, it is believed that urea groups form the linking bridge between polymer units, the linking being through the formation of urea linkages from the primary amino groups in the polymers.

A particularly valuable class of cross-linked polymers are those derived from polyamines obtained by reductively aminating ethylene/carbon monoxide copolymers.

Examples of carbonates usefully employable in the practice of this invention are diphenyl carbonate, di(2-chlorophenyl) carbonate, ditolyl carbonate, diphenyl thiocarbonate, dixylyl carbonate, dinaphthyl carbonate, and the like. The synthesis of diphenyl carbonate is described in "Organic Preparations" by C. Weygand, Interscience Publishers, Inc., New York (1945), page 184, and this method is applicable to organic carbonates generally.

Although the cross-linked products of this invention are generally made by mixing the reactants in solution in a common solvent, such as, toluene, xylene, dioxane, and the like, if desired, no solvent need be used and this constitutes a preferred alternative inasmuch as it avoids the need for subsequent removal of solvent.

In actual practice the polymeric polyprimary amine and diaryl carbonate are mixed at ordinary temperatures and the blend cast as a film, which is then allowed to stand at room temperature or baked at a temperature up to 200° C.

Although the cross-linking reaction will take place at room temperature it is generally preferred to effect it at elevated temperatures.

The time required for cross-linking depends upon the temperature employed. Time and temperature are inverse functions, i. e., the lower the temperature the longer the time and vice versa. Usually, 20 to 40 minutes at 140° to 160° C. is adequate.

As a rule an amount of diaryl carbonate is used which is sufficient to provide at least 0.5 mole of the ester per primary amino group in the polymeric polyprimary amine. If desired, however, larger or smaller amounts may be used.

The cross-linked products of this invention find application as protective coatings and as textile finishes.

As many apparently widely different embodiments of this invention may be made without departing from the spirit and scope thereof, it is to be understood that this invention is not limited to the specific embodiments thereof except as defined in the appended claims.

I claim:

1. A cross-linked polymer which is the product obtained by reacting, at a temperature of 25 to 200° C., a polymeric polyprimary amine having a molecular weight of at least 1000 and a main carbon chain with at least three extra-catenic primary amino nitrogen groups thereon, with at least 0.5 mole, per primary amino group in said polymeric polyprimary amine, of a member selected from the class consisting of diaryl carbonates and diaryl thiocarbonates.

2. A cross-linked polymer which is the product obtained by reacting, at a temperature of 25 to 200° C., a polymeric polyprimary amine having a molecular weight of at least 1000 and a main carbon chain with at least three extra-catenic primary amino nitrogens each directly attached by a single bond to the main carbon chain, with at least 0.5 mole, per primary amino group in said polymeric polyprimary amine, of a member selected from the class consisting of diaryl carbonates and diaryl thiocarbonates.

3. A cross-linked polymer which is the product obtained by reacting, at a temperature of 25 to 200° C., a polymeric polyprimary amine having a molecular weight of at least 1000 and a main carbon chain with at least three lateral groups each containing primary amino nitrogen attached through a hydrocarbon radical of from 1 to 50 carbon atoms to the main carbon chain, with at least 0.5 mole, per primary amino group in said polymeric polyprimary amine, of a member selected from the class consisting of diaryl carbonates and diaryl thiocarbonates.

4. A cross-linked polymer which is the product obtained by reacting, at a temperature of 25 to 200° C., a polymeric polyprimary amine having a molecular weight of at least 1000 and a main carbon chain with at least three extra-catenic primary amino nitrogens attached to the main carbon chain through a lateral chain containing one oxygen atom in addition to carbon atoms, with at least 0.5 mole, per primary amino group in said polymeric polyprimary amine, of a member selected from the class consisting of diaryl carbonates and diaryl thiocarbonates.

5. A cross-linked polymer which is the product obtained by reacting, at a temperature of 25 to 200° C., a polymeric polyprimary amine having a molecular weight of at least 1000 and a main carbon chain with at least three extra-catenic primary amine nitrogens each directly attached by a single bond to the main carbon chain, with at least 0.5 mole, per primary amino group in said polymeric polyprimary amine, of a member selected from the class consisting of diaryl carbonates and diaryl thiocarbonates, said polymeric polyprimary amine being the product obtained by the reductive amination with ammonia and hydrogen of a copolymer of ethylene and carbon monoxide.

6. A cross-linked polymer which is the product obtained by reacting, at a temperature of 25 to 200° C., a polymeric polyprimary amine having a molecular weight of at least 1000 and a main carbon chain with at least three lateral groups each containing primary amino nitrogen attached through a methylene radical to the main carbon chain, with at least 0.5 mole, per primary amino group in said polymeric polyprimary amine, of a member selected from the class consisting of diaryl carbonates and diaryl thiocarbonates, said polymeric polyprimary amine being the product obtained by the hydrogenation of a polymer selected from the class consisting of polymers of acrylonitrile and polymers of alkacrylonitriles.

7. A cross-linked polymer which is the product obtained by reacting, at a temperature of 25 to 200° C., a polymeric polyprimary amine having a molecular weight of at least 1000 and a main carbon chain with at least three lateral groups thereon each containing primary amino nitrogen, with at least 0.5 mole, per primary amino group in said polymeric polyprimary amine, of a member selected from the class consisting of diaryl carbonates and diaryl thiocarbonates, said polymeric polyprimary amine being the product obtained by the reaction of ammonia with a polymeric epoxide.

8. A cross-linked polymer which is the product obtained by reacting, at a temperature of 25 to 200° C., a polymeric polyprimary amine having a molecular weight of at least 1000 and a main carbon chain with at least three extra-catenic primary amino nitrogens each directly attached by a single bond to the main carbon chain, with at least 0.5 mole, per primary amino group in said polymeric polyprimary amine, of a diaryl carbonate, said polymeric polyprimary amine being the product obtained by the reductive amination with ammonia and hydrogen of a copolymer of ethylene and carbon monoxide.

9. A cross-linked polymer which is the product obtained by reacting, at a temperature of 25 to 200° C., a polymeric polyprimary amine having a molecular weight of at least 1000 and a main carbon chain with at least three extra-catenic primary amino nitrogens each directly attached by a single bond to the main carbon chain, with at least 0.5 mole, per primary amino group in said polymeric polyprimary amine being the product obtained by the reductive amination with ammonia and hydrogen of a copolymer of ethylene and carbon monoxide.

10. A cross-linked polymer which is the product obtained by reacting, at a temperature of 25 to 200° C., a polymeric polyprimary amine having a molecular weight of at least 1000 and a main carbon chain with at least three lateral groups each containing primary amino nitrogen attached through a methylene radical to the main carbon chain, with at least 0.5 mole, per primary amino group in said polymeric polyprimary amine, of a diaryl carbonate, said polymeric polyprimary amine being the product obtained by hydrogenation of a polymer of methacrylonitrile.

11. A cross-linked polymer which is the product obtained by reacting, at a temperature of 25 to 200° C., a polymeric polyprimary amine having a molecular weight of at least 1000 and a main carbon chain with at least three lateral groups each containing primary amino nitrogen attached through a lateral chain of one oxygen atom in addition to from 3 to 4 carbon atoms to the main carbon chain, with at least 0.5 mole, per primary amino group in said polymeric polyprimary amine, of a diaryl carbonate, said polymeric polyprimary amine being the product obtained by the reaction of ammonia with a polymer of allyl glycidyl ether.

12. A cross-linked polymer which is the product obtained by reacting, at a temperature of 25 to 200° C., a polymeric polyprimary amine having a molecular weight of at least 1000 and a main carbon chain with at least three extra-catenic primary amino nitrogen groups thereon, with at least 0.5 mole, per primary amino group in said polymeric polyprimary amine, of a member selected from the class consisting of diaryl carbonates and diaryl thiocarbonates, said polymeric polyprimary amine being selected from the class consisting of products obtained by the reductive amination with ammonia and hydrogen of a copolymer of ethylene and carbon monoxide, the hydrogenation of a polymer selected from the class consisting of polymers of acrylonitrile and polymers of alkacrylonitriles, and the reaction of ammonia with a polymeric epoxide.

13. A cross-linked polymer as set forth in claim 8 wherein said diaryl carbonate is diphenyl carbonate.

14. A cross-linked polymer as set forth in claim 9 wherein said diaryl thiocarbonate is diphenyl thiocarbonate.

15. A cross-linked polymer as set forth in claim 10 wherein said diaryl carbonate is diphenyl carbonate and said polymer of methacrylonitrile is a butadiene/methacrylonitrile copolymer.

16. A cross-linked polymer as set forth in claim 11 wherein said diaryl carbonate is di(2-chlorophenyl) carbonate and said polymer of allyl glycidyl ether is an allyl glycidyl ether/methyl methacrylate copolymer.

No references cited.